United States Patent
Lee et al.

(10) Patent No.: US 8,841,803 B2
(45) Date of Patent: Sep. 23, 2014

(54) SUPERCONDUCTING ROTATING MACHINE HAVING COOLER FOR ROTATOR

(75) Inventors: Jung Hyun Lee, Gyeongsangnam-do (KR); Je Heon Jung, Gyeongsangnam-do (KR); Woon Sik Kwon, Gyeongsangnam-do (KR); Heui Joo Park, Gyeongsangnam-do (KR); Chi Hwan Lee, Busan (KR); Yeong Chun Kim, Gyeongsangnam-do (KR)

(73) Assignee: Doosan Heavy Industries & Construction Co., Ltd., Changwon-si (KR)

( * ) Notice: Subject to any disclaimer, the term of this patent is extended or adjusted under 35 U.S.C. 154(b) by 515 days.

(21) Appl. No.: 12/625,661

(22) Filed: Nov. 25, 2009

(65) Prior Publication Data

US 2010/0148601 A1    Jun. 17, 2010

(30) Foreign Application Priority Data

Dec. 16, 2008  (KR) .................. 10-2008-0127658

(51) Int. Cl.
*H02K 55/04* (2006.01)

(52) U.S. Cl.
CPC ............. *H02K 55/04* (2013.01); *Y02E 40/625* (2013.01)
USPC ................................. 310/61; 310/55; 310/64

(58) Field of Classification Search
CPC ................................................... H02K 55/04
USPC ................. 310/52, 55, 61, 64; 464/18, 20, 21
See application file for complete search history.

(56) References Cited

U.S. PATENT DOCUMENTS

| | | | | |
|---|---|---|---|---|
| 3,648,082 A | * | 3/1972 | MacNab et al. | 310/10 |
| 5,245,830 A | * | 9/1993 | Aubrun et al. | 62/6 |
| 5,482,919 A | * | 1/1996 | Joshi | 310/52 |
| 5,900,685 A | * | 5/1999 | Evans et al. | 310/51 |
| 6,412,289 B1 | * | 7/2002 | Laskaris et al. | 62/50.7 |
| 6,460,349 B1 | * | 10/2002 | Kawano et al. | 62/6 |
| 6,536,218 B1 | * | 3/2003 | Steinmeyer | 62/6 |
| 7,012,347 B2 | * | 3/2006 | Kwon et al. | 310/64 |
| 2006/0189223 A1 | * | 8/2006 | Winn | 440/6 |
| 2008/0072607 A1 | * | 3/2008 | Haberbusch et al. | 62/6 |
| 2009/0229291 A1 | * | 9/2009 | Winn | 62/259.2 |
| 2010/0038980 A1 | * | 2/2010 | Frank et al. | 310/54 |

FOREIGN PATENT DOCUMENTS

| | | | | |
|---|---|---|---|---|
| JP | 2005-287287 | | 10/2005 | |
| KR | 10-2006-0092097 | | 8/2006 | |
| WO | WO 2008125632 A1 | * | 10/2008 | ............ H02K 9/24 |

* cited by examiner

*Primary Examiner* — Burton Mullins
*Assistant Examiner* — Eric Johnson
(74) *Attorney, Agent, or Firm* — Sughrue Mion, PLLC

(57) ABSTRACT

A superconducting rotating machine having a cooler for a rotator is provided. The superconducting rotating machine includes a rotator wound with a superconducting coil, a stator enclosing the rotator and separated therefrom by a predetermined gap, the cooler having a cold head directly attached to the rotator and at least one compressor connected with the cold head, and a flexible coupling disposed between the cold head and the compressor and enabling a cryogenic refrigerant to flow therein. The cold head is directly connected to the rotator, and the cold head and the compressor are driven using the flexible coupling, so that it is possible to prevent vibration of the compressor and enhance cooling efficiency by thermally separating the cryogenic cold head from the compressor.

4 Claims, 4 Drawing Sheets

SUPERCONDUCTING ROTATING MACHINE HAVING COOLER FOR ROTATOR

BACKGROUND OF THE INVENTION

1. Field of the Invention

The present invention relates, in general, to a superconducting rotating machine having a rotator and, more particularly, to a superconducting rotating machine having a cooler for a rotator, in which the cooler has a cold head and a compressor and is integrated with the rotator having a superconducting coil in order to effectively cool hot heat generated by rotation of the rotator, thereby enhancing cooling efficiency of the cooler.

2. Description of the Related Art

Such a superconducting rotating machine is configured such that a rotator having a superconducting coil is rotated, and a cooler and compressor for cooling the rotator are fixed using a rotary coupling. This system has restricted reliability because of the rotary coupling. The rotary coupling must serve as a passage through which a cryogenic refrigerant flows to cool the superconducting coil. However, a seal installed on the rotary coupling is vulnerable to high pressure and very low temperature.

Further, in the process of performing the cooling spaced apart from the rotator, it is possible that there be a considerable loss of heat while the cryogenic refrigerant flows through a cooling pipe, and the cryogenic refrigerant must be supplemented by periods due to frequent leakage.

As mentioned above, the superconducting rotating machine has a complicated cooling system for the rotator, so that it always suffers from a decrease in efficiency and an increase in production and maintenance costs.

SUMMARY OF THE INVENTION

Accordingly, the present invention has been made keeping in mind the above problems occurring in the related art, an aspect of the present invention provides a superconducting rotating machine having a cooler for a rotator, in which the cooler has a cold head and a compressor and is integrated with the rotator, thereby removing a rotary coupling and enhancing cooling performance.

In order to achieve the above object, according to one aspect of the present invention, there is provided a superconducting rotating machine having a cooler for a rotator. The superconducting rotating machine includes a rotator wound with a superconducting coil, a stator enclosing the rotator with a predetermined gap, the cooler having a cold head directly attached to the rotator and at least one compressor connected with the cold head, and a flexible coupling disposed between the cold head and the compressor and enabling a cryogenic refrigerant to flow therein.

Here, the compressors may be connected to opposite ends of the rotator.

Further, the cold head may be connected to a cooling frame surrounded by the rotator, and cool the rotator on a basis of a conduction cooling system.

Also, the rotator and the cold head may be connected with a fluid circulating system, which absorbs heat generated from the rotator and radiates the absorbed heat to the cold head.

In addition, the fluid circulating system may use helium gas as the cold fluid circulating therein.

According to exemplary embodiments of the present invention, the superconducting rotating machine is configured such that the cold head is directly connected to the rotator, and so that the cold head and the compressor are driven using the flexible coupling. As a result, it is possible to prevent vibration of the compressor and enhance cooling efficiency by thermally separating the cryogenic cold head from the compressor.

BRIEF DESCRIPTION OF THE DRAWINGS

The above and other features and advantages of the present invention will be more clearly understood from the following detailed description when taken in conjunction with the accompanying drawings, in which.

DETAILED DESCRIPTION OF THE INVENTION

Figure 1:
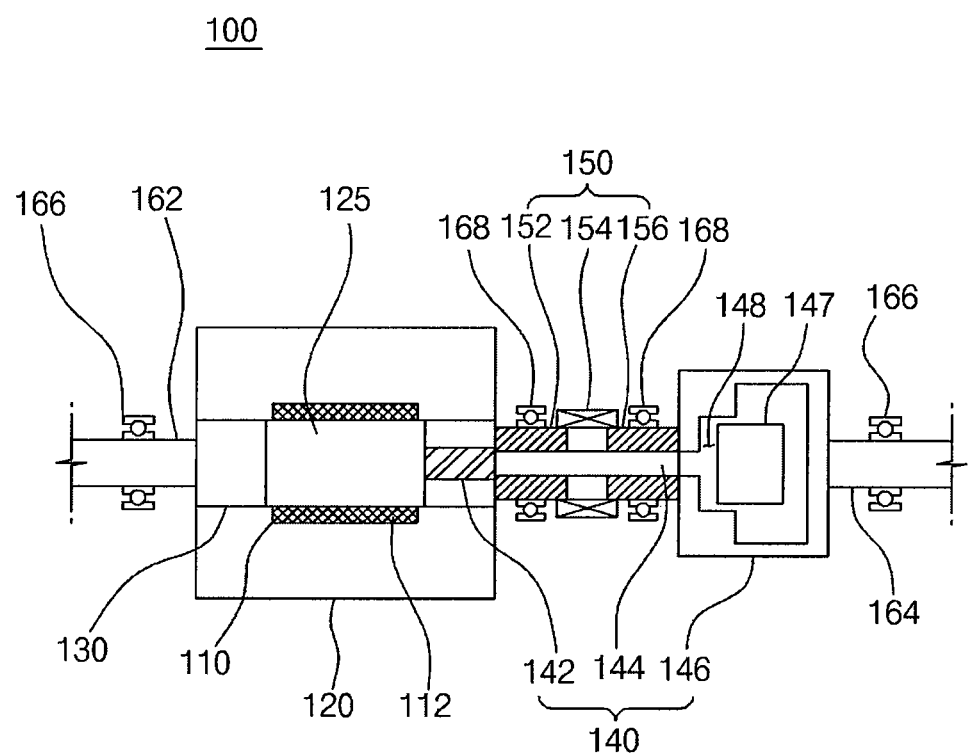
FIG. 1 conceptually illustrates a superconducting rotating machine having a cooler for a rotator in accordance with an exemplary embodiment of the present invention.

Reference will now be made in greater detail to an exemplary embodiment of the invention, an example of which is illustrated in the accompanying drawings. Wherever possible, the same reference numerals will be used throughout the drawings and the description to refer to the same or like parts.

Figure 2:
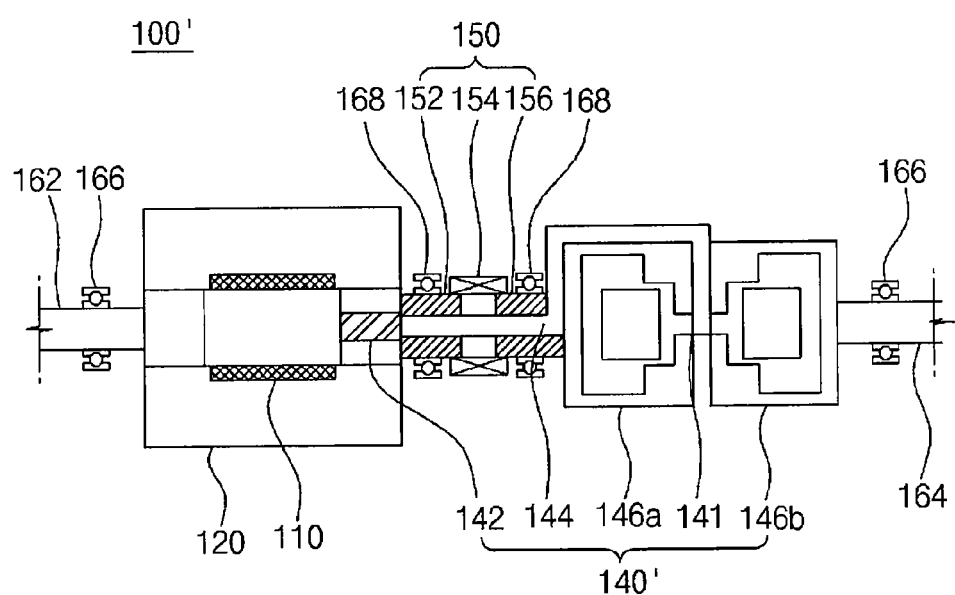
FIG. 2 illustrates the state in which compressors are disposed in a pair in a superconducting rotating machine according to another exemplary embodiment of the present invention.
Figure 3:
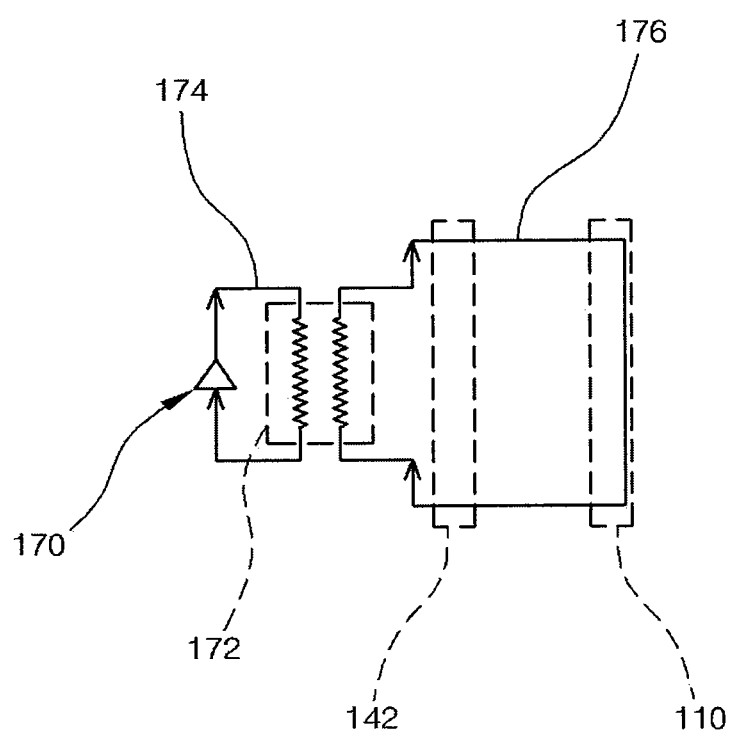
FIG. 3 conceptually illustrates an example of a fluid circulating system applied to a superconducting rotating machine according to exemplary embodiments of the present invention.
Figure 4:
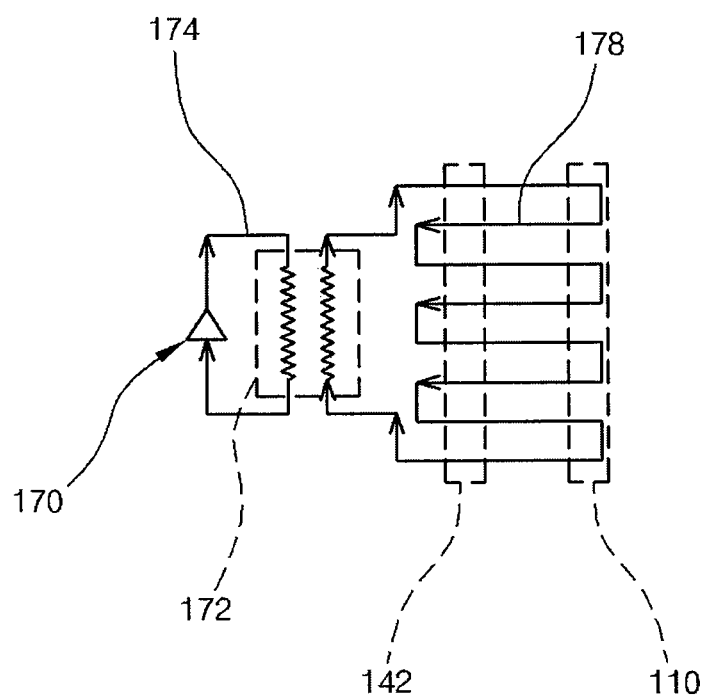
FIG. 4 conceptually illustrates another example of a fluid circulating system applied to a superconducting rotating machine according to exemplary embodiments of the present invention.

FIG. 1 conceptually illustrates a superconducting rotating machine having a cooler for a rotator in accordance with an exemplary embodiment of the present invention. FIG. 2 illustrates the state in which compressors are disposed in a pair in a superconducting rotating machine according to another exemplary embodiment of the present invention. FIG. 3 conceptually illustrates an example of a fluid circulating system applied to a superconducting rotating machine according to exemplary embodiments of the present invention. FIG. 4 conceptually illustrates another example of a fluid circulating system applied to a superconducting rotating machine according to exemplary embodiments of the present invention.

The configuration of a superconducting rotating machine having a cooler for a rotator in accordance with an exemplary embodiment of the present invention will be described below in greater detail with reference to FIG. 1 of the accompanying drawings.

The superconducting rotating machine 100 includes a rotator 110 and a stator 120 enclosing the rotator 110 and separated therefrom by a predetermined gap. The superconducting rotating machine 100 may be provided with a cooler 140 cooling the rotator 110. The rotator 110 is coupled with a torque transmission unit 130 having a predetermined shape. The torque transmission unit 130 may be kept under vacuum. The rotator 110 may be wound with a superconducting coil 112 in order to cause a strong electric field, and the torque transmission unit 130 transmits a rotating force from the superconducting coil 112 to the outside.

The cooler 140 includes a cold head 142 attached to the rotator 110 having the superconducting coil 112, a compressor 146 connected with the cold head 142, and a feed pipe 144 enabling a cryogenic refrigerant to be fed between the cold head 142 and the compressor 146. For efficient cooling, the cold head 142 of the cooler 140 is preferably attached to the rotator 110 directly generating heat. The cold head 142 is connected to a cooling frame 125 surrounded by the rotator 110, so that it can cool the rotator 110 on the basis of a conduction cooling system. To cool the superconducting coil 112 down to a temperature similar to that of the cold head 142 of the cooler 140, the cooling frame 125 may be formed of a high thermal conductivity material such as copper.

In the exemplary embodiment, the cooler 140 may serve as a cryostat, and it is advantageous to employ the conduction cooling system from the viewpoint of enhancing cooling efficiency. In the conduction cooling system, it is possible to reduce a loss of heat caused by storage or circulation of liquid, and make a system small and light. Further, it is possible to obtain flexible configuration in terms of installation angle or position. The cooler based on the conduction cooling system generally employs a two-stage Gifford-McMahon (GM) cooler, in which the first stage of a relatively high temperature is used for intermediate cooling of a radiant shield membrane or a mechanical support, and the second stage of a relatively low temperature is used for conductive cooling of a desired cooling target via a metal.

In the superconducting rotating machine 100 having such a cooler, the cold head 142 connects a sterling cold head or a sterling type pulse tube to a leading end of the compressor 146, so that pulsating waves of the compressor 146 operate the cooler 140. The pulsating waves refer to a fluid generating flow of sine or cosine waves generated when a piston 147 reciprocates, and thus can be determined according to a specific wave function.

In contrast, a GM cold head may be embodied by additionally mounting a rectifier circuit capable of converting an irregular flow into a regular flow, because it must be under constant pressure.

The rotator 110 employs a superconductor in which a resistance condition such as the temperature or an electric field approaches zero (0) under a specific environment, thereby providing various advantages compared to when a general normal conductor is employed.

In order to keep the cold head 142 in a low-temperature state at all times, the role of the compressor 146 is important. The compressor 146 helps maintain performance of the cryogenic refrigerant and improve reliability of the system by the rotation around the same axis as the rotator 110. The compressor 146 is spaced apart from the cold head 142, so that the influence of the heat of the one on the other can be minimized.

The compressor 146 has the piston 147 installed in an internal space. The piston 147 reciprocates in a compression chamber 148 to compress and expand an internal gas, so that the cryogenic refrigerant can be maintained at a low temperature.

The stator 120 constructed to house the rotator 110 is coupled to a first rotating shaft 162 supported by a bearing 166 on one side thereof, and the compressor 146 is coupled to the second rotating shaft 164 supported by another bearing 166 on one side thereof that is remotely opposite to one side of the state 120. The first and second rotating shafts 162 and 164 rotate around the same axis.

The superconducting rotating machine 100 may be additionally provided with a flexible coupling 150 between the cold head 142 and the compressor 146. The flexible coupling 150 includes a first axle 152 coupled to the side of the stator 120, a second axle 156 coupled to the side of the compressor 146, and a coupling 154 interconnecting the first and second axles 152 and 156. The coupling 154 is supported by bearings 168 at respective opposite ends thereof, and thus may rotate smoothly. The first and second axles 152 and 156 are each provided therein with a predetermined space, in which a feed pipe 144 can be installed.

The flexible coupling 150 functions to transmit an impact from the compressor 146 to the cold head 142 to a minimum level, and causes the first and second axles 152 and 156 to be correctly operated despite some unbalance between the first and second axles 152 and 156.

The flexible coupling 150 is used to reduce an adverse influence which the compressor 146 exercises on the cold head 142, and thus is preferably applied as much as possible. In other words, the flexible coupling 150 is structurally simplified such that the cooler 140 can be rotatably integrated into the rotator 110.

Hereinafter, operation of a superconducting rotating machine having a cooler for a rotator in accordance with an exemplary embodiment of the present invention will be described briefly.

First, when a cryogenic refrigerant is continuously fed to the cold head 142 through the feed pipe 144, the superconducting coil 112 is converted into a superconductor. Simultaneously, the superconducting coil 112 is excited to generate a strong electric field from an external power supply. The torque transmission unit 130 is rotated by the strong electric field generated by the superconducting coil 112. Thereby, an electric current is produced from an armature wound spaced apart from the rotator 110 by a predetermined gap.

Now, the configuration of a superconducting rotating machine 100' having a cooler for a rotator in accordance with another exemplary embodiment of the present invention will be described with reference to FIG. 2.

In the superconducting rotating machine 100', a pair of compressors 146a and 146b are interconnected on one side of a stator 120. In connection with elements equivalent to those of the superconducting rotating machine 100 according to an exemplary embodiment of the present invention, their description will be omitted, and different features will be described.

The cooler 140' includes a cold head 142, a pair of compressors 146a and 146b connected with the cold head 142, and a feed pipe 144 enabling a cryogenic refrigerant to be fed between the cold head 142 and the pair of compressors 146a and 146b. For efficient cooling, the cold head 142 of the cooler 140 is preferably attached to the rotator 110 directly generating heat.

The cooler 140', the cold head 142, and the feed pipe 144 shown in FIG. 2 are substantially equivalent elements to the cooler 140, the cold head 142, and the feed pipe 144 shown in FIG. 1, so their description will be omitted.

The first compressor 146a and the second compressor 146b are disposed such that their compression chambers are opposite to each other. The first compressor 146a is in contact with one end of a flexible coupling 150. The flexible coupling 150 includes a first axle 152 coupled to the side of the stator 120, a second axle 156 coupled to the side of the first compressor 146a, and a coupling 154 interconnecting the first and second axles 152 and 156. The coupling 154 is supported by bearings 168 at respective opposite ends thereof, and thus may rotate smoothly. The flexible coupling 150 shown in FIG. 2 is a substantially equivalent element to the flexible coupling 150 shown in FIG. 1, so its description will be omitted. A connecting pipe 141 extends from a joint between the compressors 146a and 146b to a joint between the flexible coupling 150 and the first compressor 146a, and feeds a cryogenic refrigerant into a feed pipe 144.

In this system having a plurality of compressors 146a and 146b, mutually symmetrical compression is performed in a double acting fashion, and thus is more effective from the viewpoint of preventing vibration.

For example, a fluid circulating system utilizing a cold fluid such as helium gas may be applied instead of a conduction cooling system using a cooling frame 125. An example of the fluid circulating system will be described with reference to FIG. 3.

The fluid circulating system may be configured of two closed loops, i.e. a first loop 174 and a second loop 176. The first and second loops 174 and 176 undergo heat migration through a heat exchange unit 172. In the first loop 174, a cold fluid such as a helium gas is circulated from a gas supply 170. A part of the helium gas used in the first loop 174 may be applied to the second loop 176. Further, it should be noted that, although the helium gas is used as the cold fluid in the exemplary embodiments of the present invention, the cold fluid is not limited to helium gas alone.

The second loop 176 is configured to circulate the rotator 110 and the cold head 142, absorb heat generated from the rotator 110, and radiate the absorbed heat to the cold head 142. The second loop 176 may be configured as a separate fluid circulating system, and be added to the cooling frame 125. The first loop 174 may be configured to come into contact with the cooling frame 125. Thereby, the cooling frame 125 itself may function as the second loop 176.

Meanwhile, in order to further facilitate heat exchange between the rotator 110 and the cold head 142, a third loop 178 shown in FIG. 4 may be configured as another example of the second loop. The third loop 178 is configured as a multiple loop system in which it runs zigzag between the rotator 110 and the cold head 142.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A superconducting rotating machine having a cooler for a rotator comprising:
the rotator wound with a superconducting coil;
a stator enclosing the rotator and separated therefrom by a predetermined gap;
the cooler having a cold head directly attached to the rotator and a pair of compressors connected with the cold head; and
a flexible coupling disposed between the cold head and the compressors and enabling a cryogenic refrigerant to flow therein,
the compressors are connected opposite one another such that respective outlets of the compressors face each other, and are disposed along an axis of the rotator, and the compressors are rotatable with the rotator,
the flexible coupling comprises a first axle having a first end coupled to the stator, a second axle having a first end coupled to a first one of the pair of compressors, and a coupling body extending between and coupled to a second end of the first axle and a second end of the second axle, the coupling body rotatably supported on the first and second axles by respective bearings, and
further comprising a connecting pipe extending from a joint between the compressors to a joint between the flexible coupling and the first one of the pair of compressors, and a feed pipe connected between the connecting pipe and cold head, the feed pipe disposed inside a predetermined space of the first and second axles,
wherein the connecting pipe is configured to feed the cryogenic refrigerant from the outlets of the compressors into the feed pipe.

2. The superconducting rotating machine as set forth in claim 1, wherein the cold head is connected to a cooling frame surrounded by the rotator, and cools the rotator on a basis of a conduction cooling system.

3. The superconducting rotating machine as set forth in claim 1, wherein the rotator and the cold head are connected with a fluid circulating system, which absorbs heat generated from the rotator and radiates the absorbed heat to the cold head.

4. The superconducting rotating machine as set forth in claim 3, wherein the fluid circulating system includes a helium gas as a cold fluid circulating therein.

* * * * *